No. 691,901. Patented Jan. 28, 1902.
H. W. GLASCOCK.
FOLDING BINDER REEL.
(Application filed July 2, 1901.)
(No Model.)
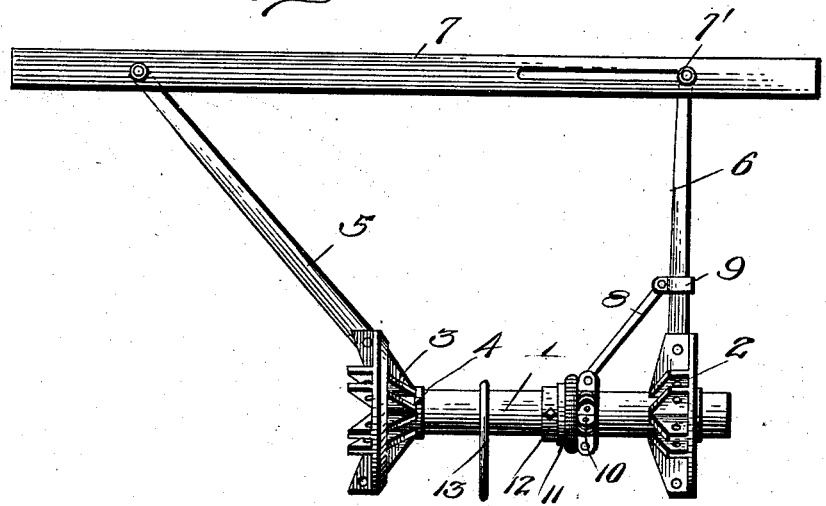
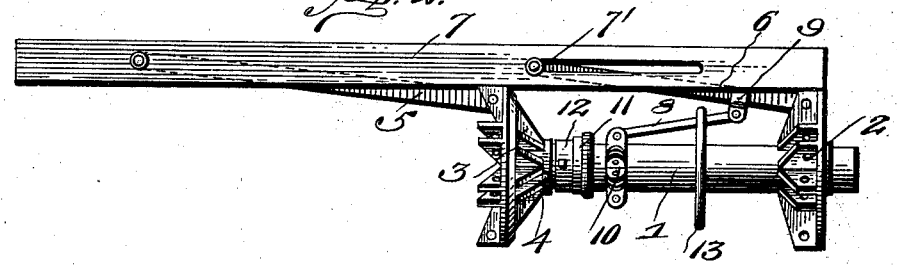
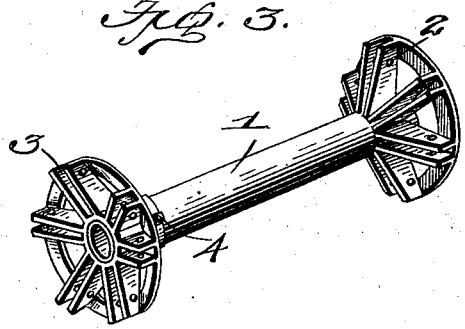
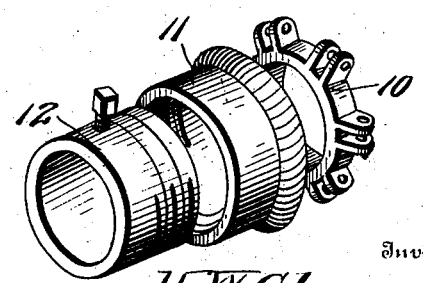
Inventor
H. W. Glascock
Witnesses
By
Attorneys

UNITED STATES PATENT OFFICE.

HAROLD W. GLASCOCK, OF RENSSELAER, MISSOURI.

FOLDING BINDER-REEL.

SPECIFICATION forming part of Letters Patent No. 691,901, dated January 28, 1902.

Application filed July 2, 1901. Serial No. 66,830. (No model.)

*To all whom it may concern:*

Be it known that I, HAROLD W. GLASCOCK, a citizen of the United States, residing at Rensselaer, in the county of Ralls and State of Missouri, have invented certain new and useful Improvements in Folding Binder-Reels; and I do declare the following to be a full, clear, and exact description of the invention, such as will enable others skilled in the art to which it appertains to make and use the same.

The invention relates to a folding binder-reel.

The object of the invention is to provide a reel of this character which shall be simple of construction, durable in use, comparatively inexpensive of production, and capable of being folded within a small compass for purposes of storage or transportation.

With these and other objects in view the invention consists of certain novel features of construction, combination, and arrangement of parts, which will be hereinafter more fully described, and particularly pointed out in the appended claims.

In the accompanying drawings, Figure 1 is a side elevation of one wing of the binder-reel, showing the reel in position for use. Fig. 2 is a similar view showing the wing in folded position. Fig. 3 is a detail perspective view of the reel-hub; and Fig. 4 is a detail perspective view of the sliding collars, showing them separated.

In the drawings, 1 denotes the hub of the reel, provided with radial spoke-sockets 2 and 3, the latter of which is removably held in position by a bolt 4 to permit of the collars shown in Fig. 4 being slipped from said hub. 5 and 6 denote spokes pivoted in said sockets and carrying at their outer ends a blade 7 of the reel. The spoke 5 is pivoted to the blade by an ordinary pivot, while the spoke 6 has a pin-and-slot connection with the blade, as shown at 7', so that when said blade is folded in position shown in Fig. 2 it will be thrown laterally but a very short distance, thus making the device compact and convenient for storage or transportation. When in an upright position, the spoke 6 is supported by a brace 8, which has one end pivoted to a collar 9, clamped to the spoke 6, and has its outer end pivoted to a collar 10, having a sliding engagement upon the hub 1 and locked in position by the collars 11 and 12, hereinafter described. When the brace is folded to the position shown in Fig. 2, a lap-ring 13 is slid upon all of the braces of the different blades, thus holding the parts in closed position.

When it is desired to raise the blades to their extended positions, the collar 10 is slid along the hub, forcing the spokes 6 into an upright position by means of the brace 8, pivoted to the spokes and to said collar 10, and in order to hold the parts in this position the collars 11 and 12 are slipped up against the collar 10, and the set-screw in collar 12 is tightened to hold the parts rigid.

The collar 11 is adapted to be screwed upon the end of the collar 12 and has a milled edge, so that after the parts are adjusted, as just described, a final and more rigid adjustment may be had by turning or unscrewing the collar 11 from the locked collar 12, thereby causing said collar 11 to jam up against the collar 10 and force the same along the hub until all the parts are as tight as desired.

From the foregoing description, taken in connection with the accompanying drawings, the construction, mode of operation, and advantages of the invention will be readily understood without requiring a more extended explanation.

Various changes in the form, proportion, and details of construction may be made without in the scope of the invention without departing from the spirit or sacrificing any of the advantages thereof.

Having thus described my invention, what I claim, and desire to secure by Letters Patent, is—

1. In a binder-reel, the combination of a hub having spoke-sockets, spokes pivoted in said sockets, a blade, one end of which is pivoted to one of the spokes, and the other end of which has a pin-and-slot connection with the opposite spoke, a slidable collar mounted upon the hub, a brace pivotally connecting the collar to one of said spokes, and means for locking said collar in longitudinal adjustment upon said hub to hold the blade distended or in operative position, substantially as set forth.

2. In a binder-reel, the combination of a hub having spoke-sockets, spokes pivoted in said sockets, a blade, one end of which is pivoted to one of the spokes, and the other end of which has a pin-and-slot connection with the opposite spoke, a slidable collar mounted upon the hub, a brace pivotally connecting the collar to one of said spokes, and means for locking the blade in closed position, substantially as set forth.

3. In a binder-reel, the combination of a hub having spoke-sockets, spokes pivoted in said sockets, a blade, one end of which is pivoted to one of the spokes, and the other end of which has a pin-and-slot connection with the opposite spoke, a slidable collar mounted upon the hub, a brace pivotally connecting the collar to one of said spokes, means for locking said collar in longitudinal adjustment upon said hub to hold the blade distended or in operative position, and means for locking the blade in closed position, substantially as set forth.

4. In a binder-reel, the combination of a hub having spoke-sockets, spokes pivoted in said sockets, a blade, one end of which is pivoted to one of the spokes and the other end of which has a pin-and-slot connection with the opposite spoke, collars slidably mounted on said hub, a set-screw for locking said collars in longitudinal adjustment with said hub, a brace pivotally connecting one of said collars to one of the spokes, and a lap-ring adapted to coact with said brace and hold the blade in closed position, substantially as set forth.

In testimony whereof I have hereunto set my hand in presence of two subscribing witnesses.

HAROLD W. GLASCOCK.

Witnesses:
   D. O. LATHAM,
   M. D. MCRAE.